I. W. LINCOLN.
Combined Dough-Kneader and Flour-Sifter.

No. 226,085. Patented Mar. 30, 1880.

Witnesses.
Nat. E. Oliphant
Geo. R. Porter

Inventor.
Isaac W. Lincoln
per Chas. H. Fowler
Attorney

UNITED STATES PATENT OFFICE.

ISAAC W. LINCOLN, OF ST. JOSEPH, MISSOURI.

COMBINED DOUGH-KNEADER AND FLOUR-SIFTER.

SPECIFICATION forming part of Letters Patent No. 226,085, dated March 30, 1880.

Application filed November 8, 1879.

*To all whom it may concern:*

Be it known that I, ISAAC W. LINCOLN, of St. Joseph, in the county of Buchanan and State of Missouri, have invented a new and valuable Improvement in Combined Dough-Kneader and Flour-Sifter; and I do hereby declare that the following is a full, clear, and exact description of the construction and operation of the same, reference being had to the annexed drawings, making a part of this specification, and to the letters and figures of reference marked thereon.

Figure 1:
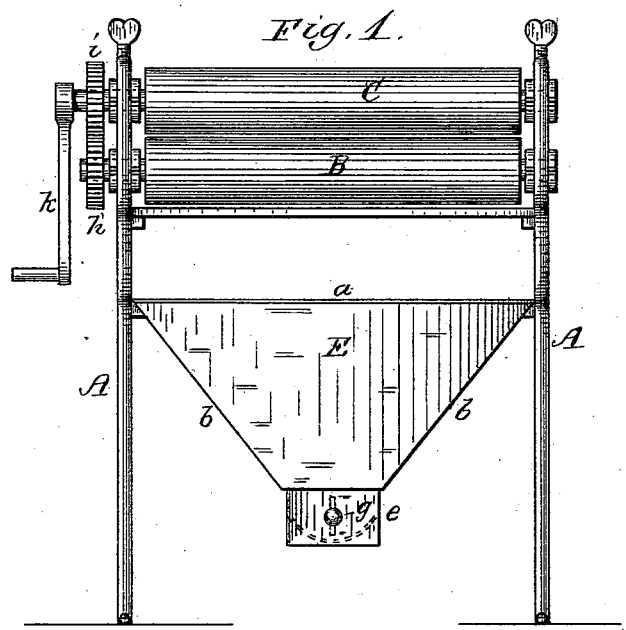
Figure 2:
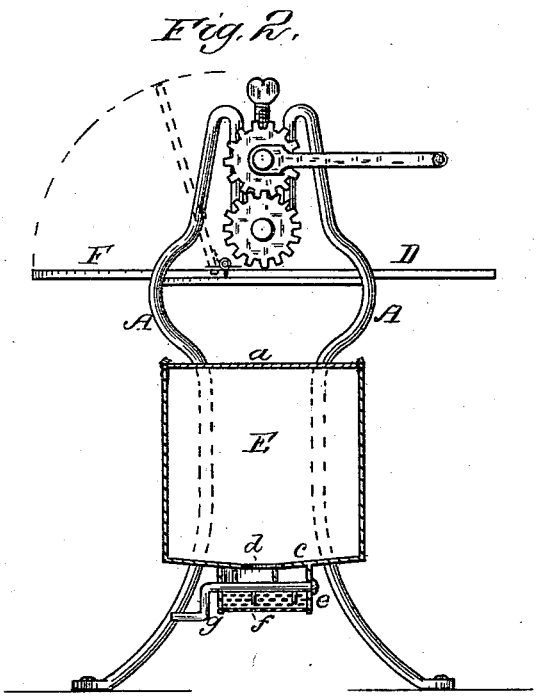

Figure 1 of the drawings is a representation of a front elevation of my invention. Fig. 2 is an end view thereof, with the flour-chest in section.

This invention has relation to that class of machines employed for the purpose of kneading dough by passing it between two rollers arranged within a frame.

The object of the present invention is to provide dough-kneading machines of the above class with a flour-sifter secured to the frame below and under the rollers; also a chest for containing and storing the flour to be sifted; and, further, to provide the sifter with a suitable agitator or stirrer to more successfully put the flour in a condition for passing through the meshes of the sieve, as will be hereinafter more fully described, and subsequently pointed out in the claim.

In the accompanying drawings, A represents a frame, preferably of metal, adapted to be firmly secured to the floor or other foundation. The upper portion of the frame A supports rollers B C, the upper roller being made adjustable with relation to the lower roller, to adapt them to various classes of work.

To the sides of the frame A is secured a table, D, on a line below the roller B, and which passes under it and extends out a sufficient distance therefrom to receive the dough as it passes from between the rollers.

Secured to the frame A, below the table D, is a chest, E, provided with a sliding cover, $a$, for containing the flour. This chest has inclined sides $b$, and also inclined bottom $c$, to conduct the flour through the opening $d$ into the sifting-box $e$, said box having arranged therein a sieve, $f$, and a rotary agitator, $g$, so that when flour is required for use in the process of kneading the dough all that is necessary is to turn the agitator $g$, which forces the flour through the sieve into a suitable receptacle placed under the chest to receive it.

The flour, after being sifted, is placed upon the board F and mixed with the dough previous to its being introduced between the rollers B C in the process of kneading. This board F is hinged to the table D, so that it may be raised to a vertical position when access is required to the flour-chest E, also to facilitate the filling of the same.

The shafts of the rollers B C are provided upon their outer ends with suitable cog-wheels $h\,i$, the shaft of the upper roller having a crank, $k$, for rotating the rollers.

Having thus described my invention, what I claim as new, and desire to secure by Letters Patent, is—

The dough-kneading and flour-sifting machine herein described, consisting of the frame A, carrying the rolls B C, having cogs $i\,h$, table D, arranged under said rolls, and having the board F hinged thereto and in line therewith when closed, flour-chest E, attached to the frame under the table and provided with the sliding cover $a$, inclined sides $b\,b$, and inclined bottom $c$, having the central orifice, $d$, leading into the sifting-box $e$, provided with the sieve-bottom $f$ and agitator $g$, the whole constructed and arranged to operate in the manner and for the purposes set forth.

In testimony that I claim the above I have hereunto subscribed my name in the presence of two witnesses.

ISAAC W. LINCOLN.

Witnesses:
HARRISON B. BRANCH,
RICE D. GILKEY.